United States Patent
Campanella et al.

(10) Patent No.: US 6,371,540 B1
(45) Date of Patent: Apr. 16, 2002

(54) BUMPER BEAM FOR MOTOR VEHICLES

(75) Inventors: Thierry Campanella, Linas (FR); Richard Kergen, Fexhe-le-Haut-Clocher; Pascal Magain, Montbliart, both of (BE)

(73) Assignees: Peugeot Citröen Automobiles S.A., Neuilly sur Seine (FR); Recherche et Developpement du Groupe Cockerill Sambre en Abrégé, Liege (BE)

( * ) Notice: Subject to any disclaimer, the term of this patent is extended or adjusted under 35 U.S.C. 154(b) by 0 days.

(21) Appl. No.: 09/786,155
(22) PCT Filed: Jul. 4, 2000
(86) PCT No.: PCT/FR00/01915
§ 371 Date: May 15, 2001
§ 102(e) Date: May 15, 2001
(87) PCT Pub. No.: WO01/02218
PCT Pub. Date: Jan. 11, 2001

(30) Foreign Application Priority Data

May 7, 1999 (FR) .............................. 99 08651

(51) Int. Cl.[7] .............................................. B60R 19/03
(52) U.S. Cl. .................... 293/102; 293/120; 293/135; 293/121
(58) Field of Search ................ 293/102, 120, 293/133, 132, 121, 155, 154, 71, 135

(56) References Cited

U.S. PATENT DOCUMENTS

| | | | |
|---|---|---|---|
| 3,997,208 A | * 12/1976 | Nomiyama | 293/71 |
| 4,227,593 A | 10/1980 | Bricmont et al. | |
| 4,264,094 A | * 4/1981 | White et al. | 293/135 |
| 4,328,986 A | * 5/1982 | Weller et al. | 293/120 |
| 4,413,856 A | * 11/1983 | McMahan et al. | 293/120 |
| 4,457,547 A | * 7/1984 | Sekiyama et al. | 293/120 |
| 4,573,724 A | * 3/1986 | Campen | 293/136 |
| 5,031,947 A | * 7/1991 | Chen | 293/121 |
| 5,154,462 A | * 10/1992 | Carpenter | 293/120 |
| 5,201,912 A | 4/1993 | Terada et al. | |
| 5,290,079 A | * 3/1994 | Syamal | 293/120 |
| 5,441,319 A | * 8/1995 | Oyama et al. | 293/155 |
| 5,967,592 A | * 10/1999 | Freeman | 293/120 |
| 6,179,355 B1 | * 1/2001 | Chou et al. | 293/120 |
| 6,290,272 B1 | * 9/2001 | Braun | 293/120 |

FOREIGN PATENT DOCUMENTS

| | | | |
|---|---|---|---|
| DE | 3626150 | * | 2/1988 |
| DE | 195 45 069 | | 4/1997 |
| FR | 2766437 | | 1/1999 |
| JP | 7-164983 | | 6/1995 |

* cited by examiner

Primary Examiner—Ken Patel
(74) Attorney, Agent, or Firm—Connolly Bove Lodge & Hutz LLP

(57) ABSTRACT

A bumper beam for motor vehicles includes vertical front and rear plates made of at least one metallic material. At least one elongated core made of metallic material is positioned between the two sole plates. An energy absorber is located at each end of the core and formed of a metallic hollow body, the energy absorber being positioned at right angles to the sole plates or to the core. The metallic materials of the core and the energy absorber have a ratio of elastic limit to breaking stress that is lower than that of the sole plate metallic material and lower than 0.9.

30 Claims, 5 Drawing Sheets

BUMPER BEAM FOR MOTOR VEHICLES

FIELD OF THE INVENTION

The present invention relates to a bumper beam for motor vehicles.

BACKGROUND OF THE INVENTION

Motor manufacturers are concerned with improving passenger safety and with reducing the cost of repairing vehicles in the event of impacts, while at the same time avoiding any significant increase in the weight of these vehicles.

For safety particularly in the event of a frontal impact, manufacturers are optimizing the various parts of the vehicle so as to guarantee maximum absorption of kinetic energy by mechanical deformation of zones away from the cabin and so as to strengthen the cabin in order to protect the passengers.

For repairing vehicle parts damaged after a frontal impact, manufacturers are looking first of all to raise the speed at which irreversible damage occurs to as high as possible a speed, this speed being of the order of 5 km/h, and then to limit the damage to the ends of the vehicle, that is to say to zones which can easily be repaired, up to speeds of the order of 15 km/h.

The safety objective is generally achieved by providing the vehicle with longerons, the gradual deformation of the ends of which absorbs the kinetic energy of the vehicle, the zones of the longerons located closest to the cabin and the cabin itself being designed to deform very little.

However, given the limited space in motor vehicles, manufacturers, are having to develop structures which guarantee a good level of energy absorption from the end of the vehicle up to the non-deformable zone while at the same time avoiding dead zones, that is to say zones which cannot deform axially and absorb significant deformation work.

Furthermore, manufacturers have reduced the costs of repair in low-speed impacts by modifying the bumpers or the scuff moldings of the vehicles, particularly by strengthening the bumper beam and inserting, between this beam and the longerons, deformable mechanical elements known as energy absorbers which are designed to crumple under a force which is appreciably lower than the force required to deform the longerons.

In the event of a low-speed impact, all that is therefore required is for a limited number of parts to be replaced, thus limiting repair costs.

Repairs are also improved by strengthening the bumper beam so as to raise the speed of impact without damage and to guarantee good distribution of forces in the event of a higher-speed impact.

What happens is that the bumper has to transmit the forces to the energy absorbers and then to the longerons of the vehicle in the later phases of the impact.

The way in which this structure, which consists of the bumper beam and of the energy absorbers, works has also to be extremely stable with respect to angles of impact more or less steeply inclined with respect to the longitudinal axis of the vehicle.

In an attempt to satisfy these criteria, numerous solutions have been implemented to date, but they lead to an appreciable increase in the weight of the vehicle and in cost.

One of the known solutions consists in fitting steel blades in bumpers made of synthetic materials and in incorporating energy absorbers between the bumper and the longerons of the vehicle. However, the energy absorbers used to date are not always satisfactory and entail adding additional parts, which increases the weight of the vehicle.

To avoid this drawback, energy absorbers are known which are made of aluminum, which allows the weight to be reduced, but their energy-absorption properties are generally not easy to control and often insufficient, while the material costs and cost of manufacture of such absorbers remain high.

Also known are energy absorbers made of steel with a relatively complex geometry which fulfills the safety criteria and allow a slight reduction in weight. However their cost of manufacture also remains very high.

BRIEF DESCRIPTION OF THE INVENTION

An object of the invention is to avoid these drawbacks by proposing a bumper beam for motor vehicles which, at the same time, makes it possible to improve the energy absorption and also to reduce both the cost of repair in the case of a low-speed impact, and the weight of the vehicle.

The subject of the invention is therefore a bumper beam for motor vehicles, characterized in that it comprises a front sole plate and a rear sole plate which are vertical and made of at least one metallic material, at least one core made of metallic material and positioned between the two sole plates and, at each end of said core, an energy absorber formed of a hollow body made of metallic material running at right angles to the sole plate and connected to at least said front sole plate or to said core, the metallic materials of this core and of the hollow body of the energy absorbers having a ratio between the elastic limit and the breaking stress lower than that of the metallic material of said sole plates and lower than 0.9.

According to other preferred characteristics of the invention:
- the metallic material of the sole plates is a steel with a very high elastic limit higher than 400 MPa or an aluminum with a very high elastic limit of above 250 MPa,
- the sole plates are made of the same metallic material and have different thicknesses,
- the metallic material of the front sole plate has a ratio between the elastic limit and the breaking stress lower than that of the metallic material of the rear sole plate,
- the bumper beam has two parallel cores stretching between said sole plates,
- the thicknesses of the sole plates and of the cores are different and the thickness of the sole plates is preferably greater than that of the cores;
- said core comprises a succession of alternating projecting parts and recessed parts running at right angles to the longitudinal axis of this core,
- the distance between the top of the projecting parts and the bottom of the recessed parts of said core is between ¹⁄₂₀th and one half of the period of the projecting parts or recessed parts,
- the distance between the bottom of the recessed parts of the two cores is between 0 and half the period of said projecting parts or recessed parts,
- the hollow body of each energy absorber has a cross section in the shape of a four-armed cross, the arms extending in twos in the continuation of one another and making an angle of 90° between them.

Other characteristics and advantages of the invention will become apparent in the course of the description which will follow, given merely by way of example and made with reference to the appended drawings, in which:

DETAILED DESCRIPTION OF THE INVENTION

Figure 1:
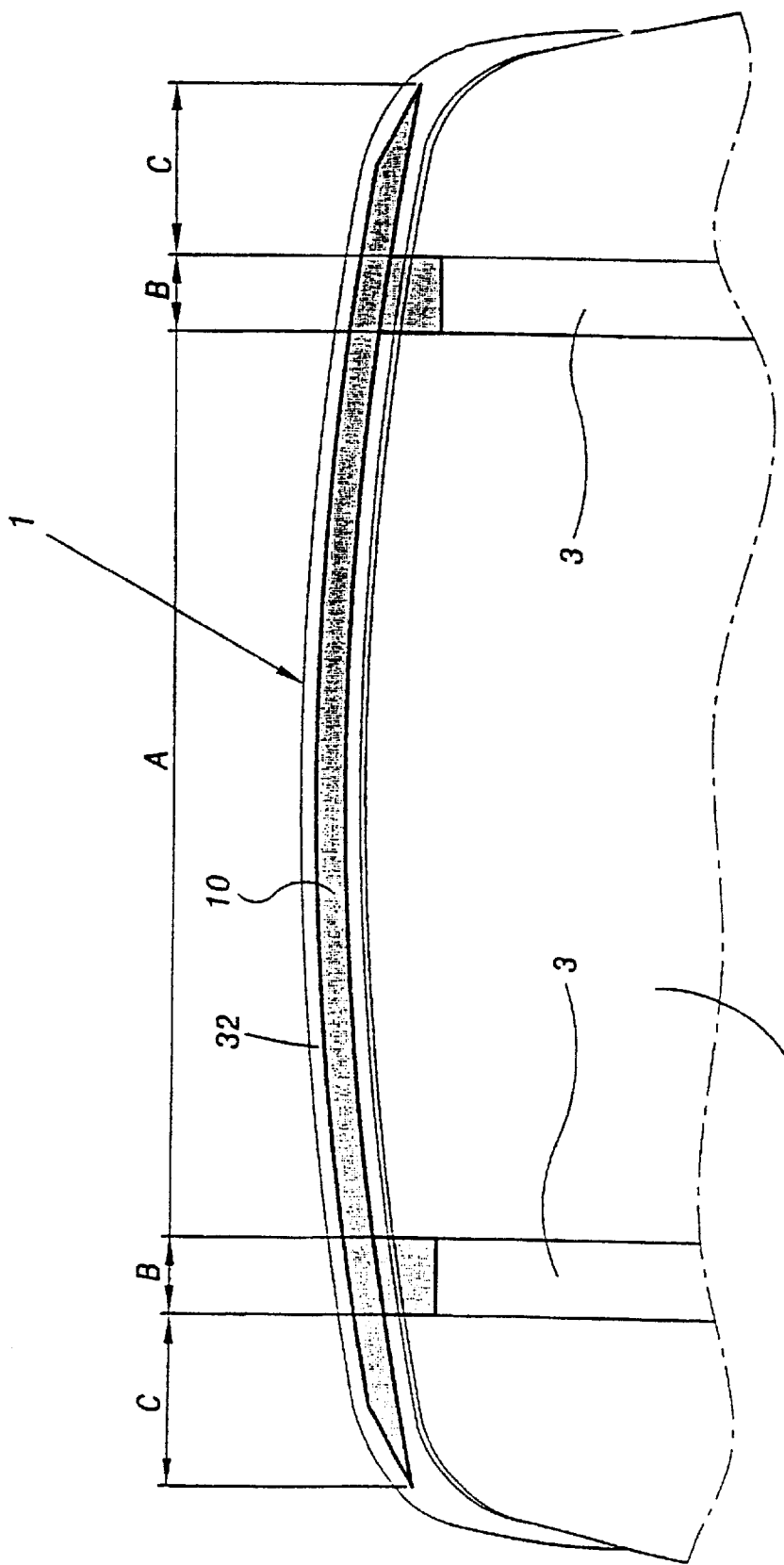
FIG. 1 is a schematic view of a motor vehicle front bumper equipped with a beam according to the invention.

FIG. 1 schematically depicts a bumper denoted in its entirety by the reference 1 and which, in the embodiment depicted in this figure, is mounted at the front of a motor vehicle 2 via two parallel longerons 3 running at right angles to said bumper 1.

This bumper 1 may equally be mounted at the rear of the motor vehicle.

Figure 2:
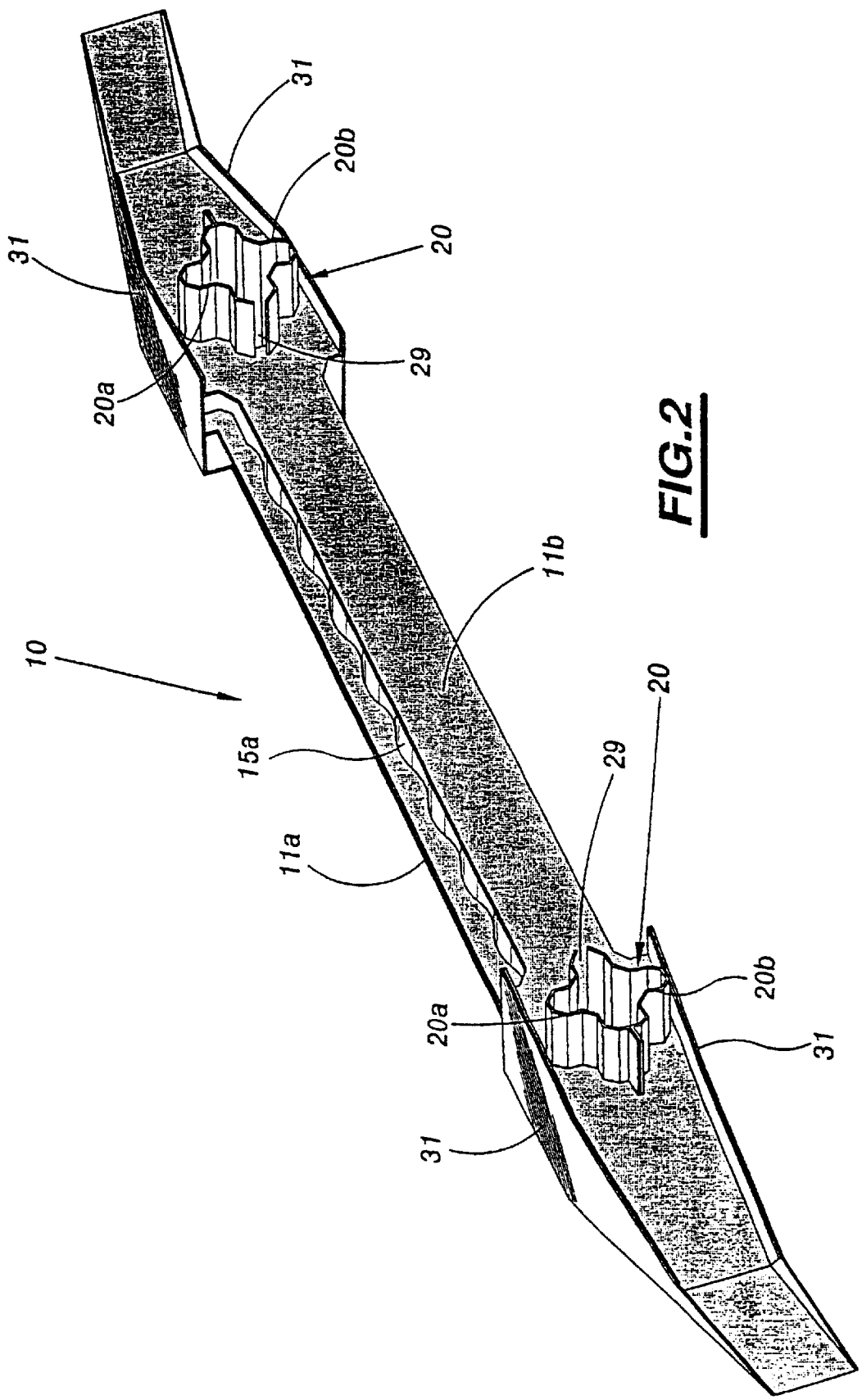
FIG. 2 is a schematic perspective view of the bumper beam according to the invention.

As depicted in FIGS. 1 and 2, the bumper 1 is formed by a beam 10 which comprises a central zone A constituting the crossmember, two lateral zones B each constituting an energy absorber and each arranged one on either side of the central zone A and two end zones C constituting a protection for the lateral corners of the motor vehicle 2.

The central zone A of the beam 10 essentially carries out a function of protecting the motor vehicle 2 with no visible damage for low-speed impacts and also a function of spreading and transmitting contact force to the lateral zones B and then to the longerons 3 for higher-speed impacts, via said lateral zones B each of which constitutes an energy absorber, as will be seen later on.

In general, the beam 10 is made from at least two metallic materials which differ in terms of their nature, their mechanical properties or their thickness.

Figure 3:
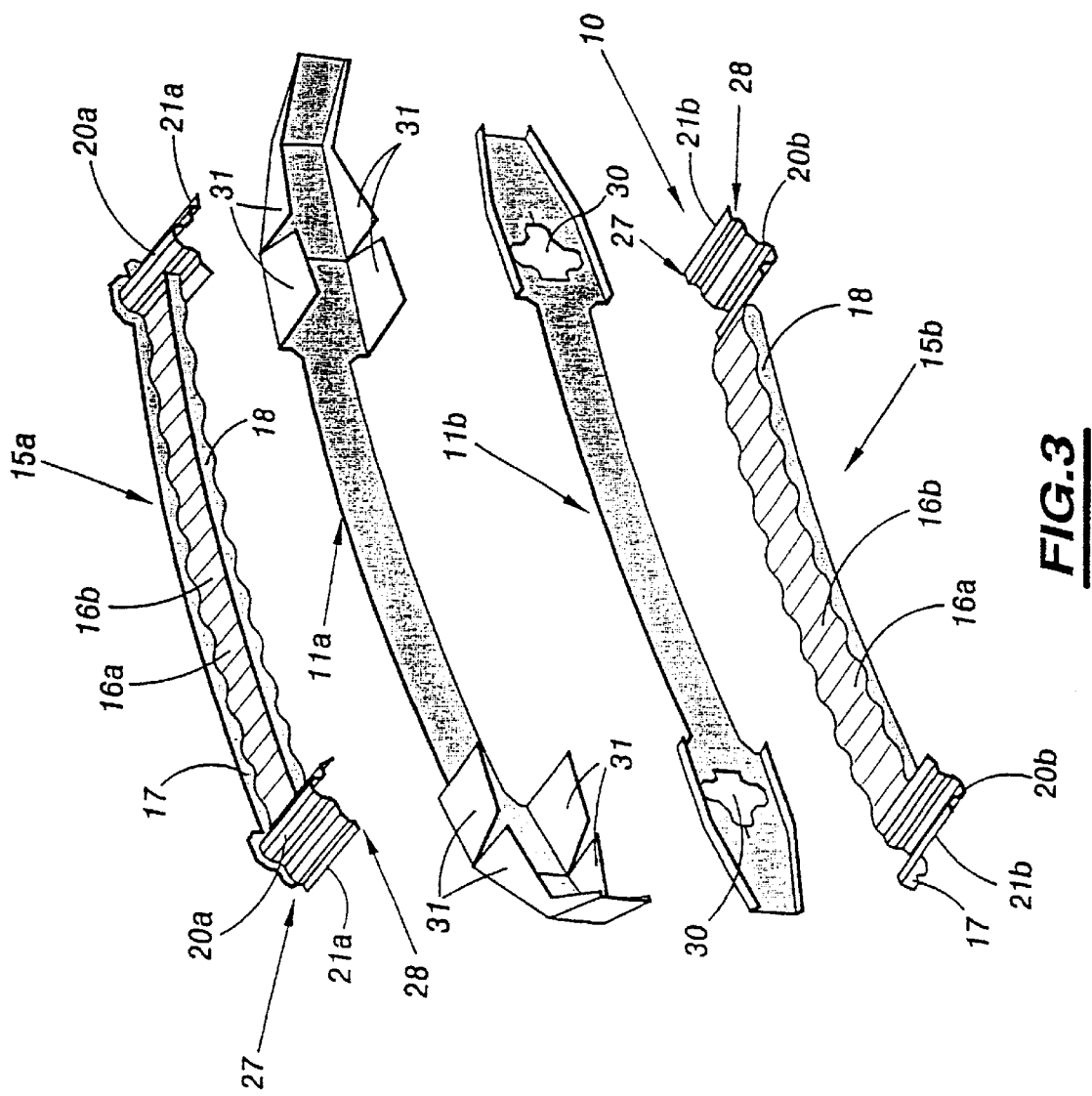
FIG. 3 is a schematic perspective exploded view of the bumper beam according to the invention.

As depicted in particular in FIGS. 2 and 3, the beam 10 comprises two vertical and longitudinal sole plates, namely a front sole plate 11a and a rear sole plate 11b, respectively, made of at least one metallic material which has a very high elastic limit, such as a steel with an elastic limit higher than 400 MPa and preferably between 1000 and 1500 MPa or an aluminum with an elastic limit higher than 250 MPa.

The sole plates 11a and 11b form between them a gap in which at least one core 15a or 15b is inserted. As a preference, two cores, an upper core 15a and a lower core 15b, respectively, are inserted between the two sole plates and are arranged horizontally and parallel to one another.

In what follows, the description will be given with respect to an embodiment with two cores 15a and 15b running parallel to one another.

The cores 15a and 15b are made of a metallic material with high deformability and preferably of a metallic material having a ratio between the elastic limit and the breaking stress lower than that of the metallic material of the sole plates 11a and 11b and lower than 0.9.

According to a first embodiment, the sole plates 11a and 11b are made of the same metallic material and have different thicknesses.

According to another embodiment, the metallic material of the front sole plate 11a has a ratio between the elastic limit and the breaking stress lower than that of the metallic material of the rear sole plate 11b.

Each core 15a and 15b comprises, in the central part A, a succession of alternating projecting parts 16a and recessed parts 16b running at right angles to the longitudinal direction of the corresponding core.

In general, the cores 15a and 15b have a shape which makes it possible to reduce their thicknesses while at the same time preserving the their resistance to buckling, and these cores have a certain ductility and, for preference, a ratio between the elastic limit and the breaking stress lower than 0.9. The projecting parts 16a and recessed parts 16b have a period tailored to optimize the behavior of these cores and of the beam.

Figure 4:
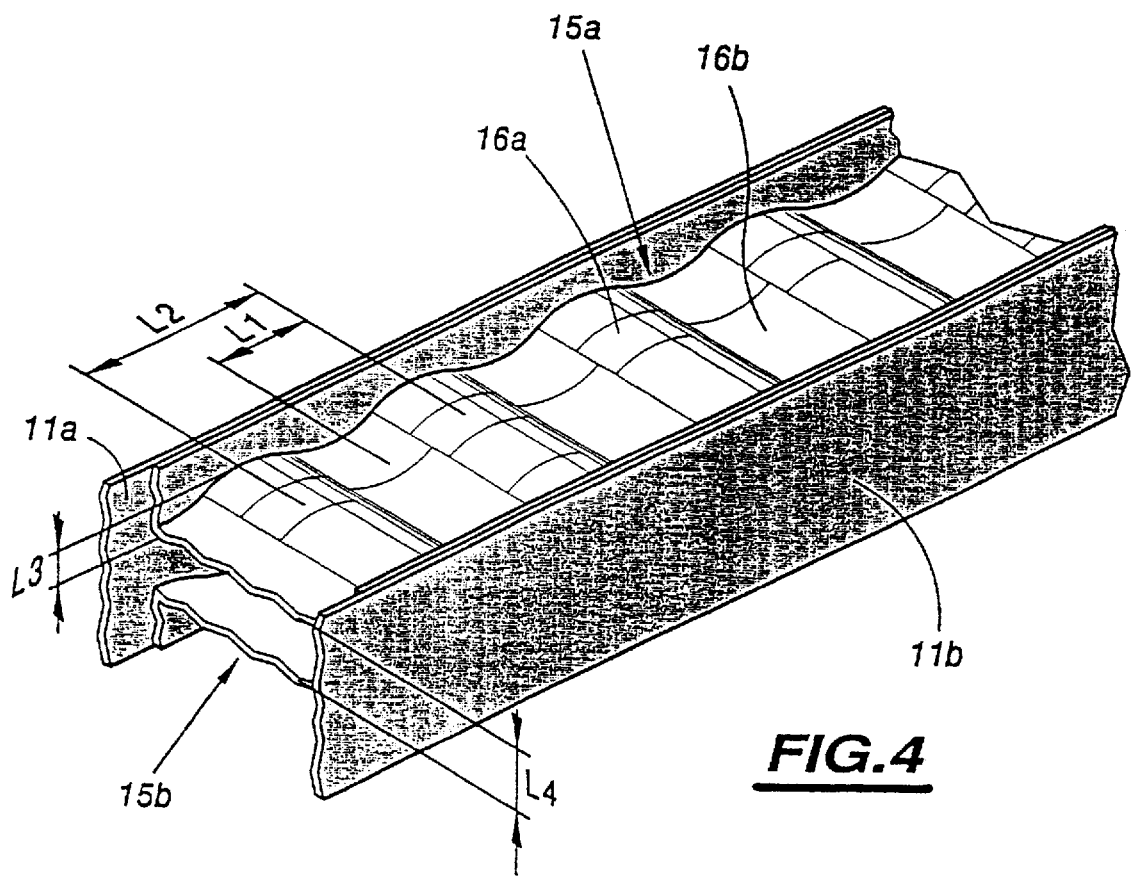
FIG. 4 is a schematic perspective view of the central part of the bumper beam according to the invention.

According to a preferred embodiment depicted more specifically in FIG. 4, the period L2 of the projecting parts 16a and recessed parts 16b is uniform along the entire length of each core 15a and 15b.

In addition, the distance L1 between the axis of a projecting part 16a and the axis of a recessed part 16b is equal to half the period L2, and the distance L3 between the top of the projecting parts 16a and the bottom of the recessed parts of each core 15a and 15b is between ½oth and one half of the period L1 of said projecting parts or recessed parts.

In addition, the distance L4 between the bottom of the recessed parts 16b of the two cores 15a and 15b is between 0 and half the period L1 of said projecting parts or recessed parts.

According to another embodiment, the projecting parts 16a and recessed parts 16b of one core 15a are offset with respect to the projecting parts 16a and recessed parts 16b of the other core 15b so that a low point on one core faces a high point on the other core so that the distance between the cores 15a and 15b is constant.

In the embodiment depicted in the figures, the projecting parts 16a and recessed parts 16b are formed by corrugations. They may equally be formed of ribs and these projecting parts 16a and recessed parts 16b are produced by deforming the metal and allow the thickness of the cores 15a and 15b to be reduced appreciably, for the same buckling and warping load.

The projecting parts 16a may equally be formed by depressions or cuts with folded-over edges.

The lateral parts B of the beam 10 arranged on each side of the central part A of, said beam 10 each constitute an energy absorber formed by a hollow body 20 made of metallic material and running at right angles to the sole plates 11a and 11b.

The metallic material of which the hollow body 20 of each energy absorber is made has a ratio between the elastic limit and the breaking stress lower than that of the metallic material of said sole plates 11a and 11b and lower than 0.9.

Figure 5:
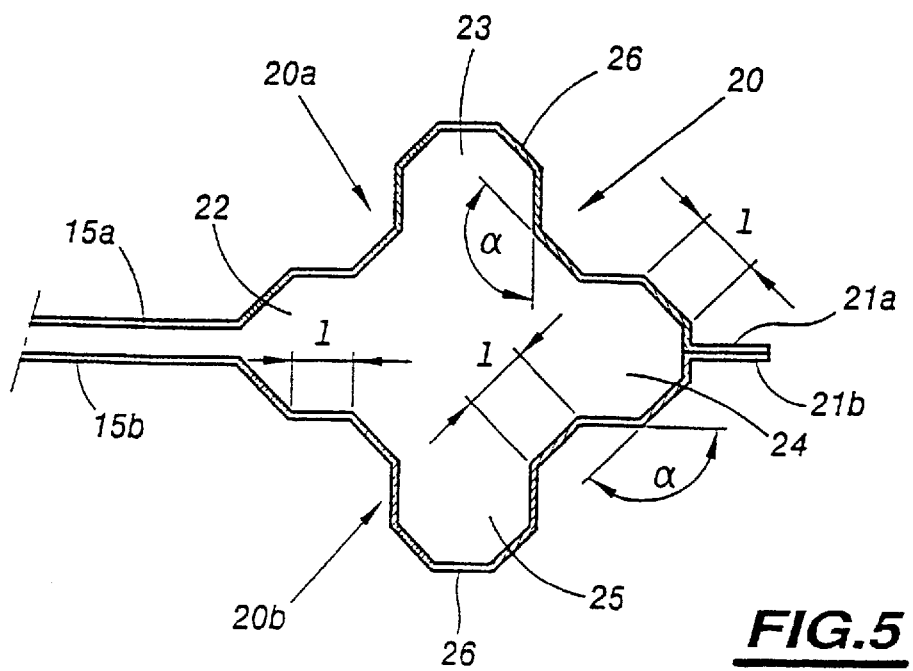
FIG. 5 is a schematic view in cross section of an energy absorber of the bumper beam according to the invention.

According to a preferred embodiment, depicted in FIGS. 3 and 5, each hollow body 20 constituting an energy absorber is formed by two symmetric hollow half-bodies 20a and 20b respectively each extending one core 15a and 15b respectively.

The two hollow half-bodies 20a and 20b are joined together at their free edges 21a and 21b respectively, for example by spot welding or by a continuous welding or by crimping or using an appropriate adhesive or by local pressing or alternatively by a seam.

One hollow body 20 of one energy absorber will be described with reference to FIG. 5, the hollow body of the other energy absorber being identical.

The hollow body 20 has a cross section in the shape of a four-armed cross, the arms 22, 23, 24 and 25 respectively, extending in twos in the continuation of one another and forming an angle of 90° between them. The wall of the hollow body 20 is formed by a succession of facets 26 of identical width "l" making an angle α of 135° with each other. The number of facets 26 of the hollow body 20 is equal to twenty-four.

Furthermore, the hollow body 20 of each energy absorber is open on one of its sides and, in the embodiment depicted in the figures, the hollow body 20 has an opening 29 arranged on the same side as the central part of the beam 10.

In a variant, the hollow body 20 of each energy absorber is closed on its entire periphery.

In general, the hollow body 20 of each energy absorber is connected to at least the front sole plate 11a or to the core in the case where the beam has a single core or to the two cores when the beam comprises two cores, 15a and 15b respectively.

The connection between each energy absorber and the front sole plate 11a or the cores 15a and 15b can be made in various ways.

According to a first embodiment, the hollow body 20 of each energy absorber has a first end 27 connected to the front sole plate 11a for example by welding, crimping, local pressing or a seam and a second end 28 resting on a longeron 3 of the structure of the motor vehicle and passing freely through the rear sole plate 11b via an orifice 30 which has an outline of a shape that complements the cross section of said hollow body 20, as depicted in FIG. 3.

According to a second embodiment, the hollow body 20 of each energy absorber has a first end 27 resting on the front sole plate 11a and a second end 28 resting on a longeron 3 of the structure of the motor vehicle. In this embodiment, this second end 28 passes through the rear sole plate 11b via an orifice 30 which has an outline of a shape that complements the cross section of said hollow body 20 and the hollow body 20 is connected to the rear sole plate 11b for example by welding, by crimping, by local pressing or by a seam.

According to a third embodiment, the body 20 of each energy absorber has a first end 27 resting on the front sole plate 11a and a second end 28 connected to the rear sole plate 11b for example by welding, crimping, local pressing or a seam. In this case, the hollow body 20 of each energy absorber does not protrude beyond the rear sole plate 11b and this rear sole plate 11b rests on a longeron 3 of the structure of the motor vehicle.

According to another embodiment, the hollow body 20 of each energy absorber rests on the front sole plate 11a and is connected to the core 15a or 15b or to both cores 15a and 15b.

According to yet another embodiment, the hollow body 20 of each energy absorber is connected to the front sole plate 11a for example by welding, by crimping, by local pressing or by a seam and is also connected to the core 15a or 15b in the case where the beam 10 has just one core or is connected to both cores 15a and 15b in the case where the beam 10 has two cores 15a and 15b.

In general, the hollow body 20 of each energy absorber may be formed of an independent part fixed to the ends of the core or cores 15a and 15b by welding, by crimping or by the rolling of mating edges, or by a seam or by local pressing.

In a variant, the hollow body 20 of each energy absorber can be produced in the form of a closed body formed integrally with the cores 15a and 15b or fixed to said cores 15a and 15b.

The metallic material of the hollow body 20 of each energy absorber has a thickness preferably of less than 1.2 mm.

Each core 15a and 15b has on its longitudinal edge facing the front sole plate 11a, a rim 17 for attachment to said front sole plate 11a and running along the entire length of each core 15a and 15b.

Likewise, each core 15a and 15b has, on its longitudinal edge facing the rear sole plate 11b, a rim 18 for attachment to said rear sole plate 11b and running only along the length of the central part of each core 15a and 15b.

The soles 11a and 11b can be assembled with the cores 15a and 15b by conventional assembly methods of the welding or mechanical type.

In the case of a weld, this weld may be a spot weld or a continuous laser weld.

However, the lengths of the zones that require connection are great, most particularly in the central zone A, and this significantly penalizes the cost when performing assembly by welding.

Mechanical assembly techniques are such that the deformation by local pressing allows a great many points to be produced simultaneously, for example in a press. However, this type of assembly poses problems because of the superior mechanical properties of the metallic material of which the sole plates 11a and 11b are made.

Assembly of the crimping type is achieved by forming, for example, a seam produced by simultaneously rolling the longitudinal edges of the sole plates 11a and 11b together with the longitudinal edges 17 and 18 of the cores 15a and 15b.

This type of assembly can be performed in a single operation and presents a technical advantage owing to the fact that the cylindrical shape of the rolled zones contributes to the mechanical strengthening of the beam 10.

Finally, the outer sole plate 11a has, at the lateral parts B and at the end parts C, horizontal rims 31 which cover the body 20 of each energy absorber and rest on the edge of the inner sole plate 11b in said zones B and C.

Figure 6:
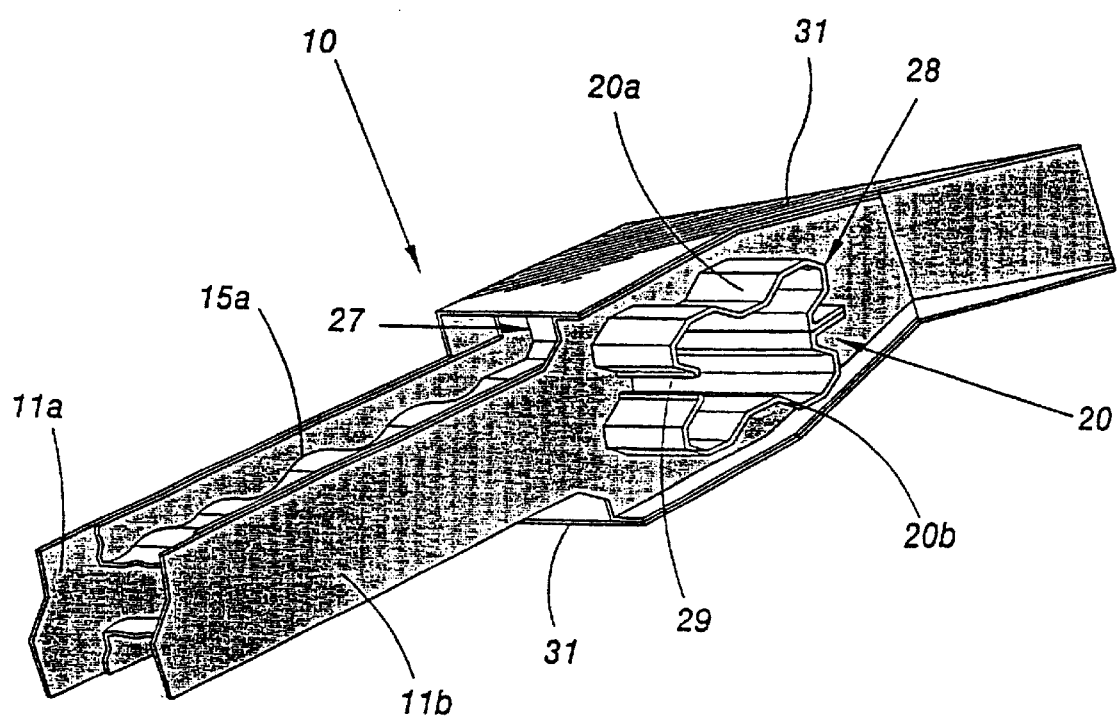
FIG. 6 is a schematic perspective view of another embodiment of the bumper beam according to the invention.

FIG. 6 depicts a variant embodiment of the energy absorber.

In this embodiment, each energy absorber consists of a hollow body 20 formed of a four-armed cross with arms 22, 23, 24 and 25 respectively. In this case, the cross is inclined so that it forms a "X". The hollow body 20 may equally have an opening 29 on the same side as the central part A of the beam 10.

The use of a steel with superior mechanical properties for the sole plates 11a and 11b, combined with a more ductile steel for the cores 15a and 15b so as to produce a structure combining the beam and absorber functions in a single piece, makes it possible to reduce the weight and the cost of producing a bumper comprising such a beam and to optimize the behavior, particularly by guaranteeing an optimum functional travel of the energy absorbers.

The use of a steel with a high elastic limit makes it possible to reduce the weight and combining it with a more ductile steel makes it possible to produce a single piece of complex shape in spite of the limited deformability of high-elastic-limit steels.

The central zone A carries out a function of protecting the vehicle without visible damage for low-speed impacts and a function of spreading and transmitting contact loads to the lateral zones B constituting the energy absorbers and then to the longerons 3 for higher-speed impacts.

A structure such as this makes it possible to optimize the weight of the beam 10, because the high-elastic-limit steel of the sole plates 11a and 11b allows a high level of strain to be applied before the material enters the plastic phase and before the onset of permanent deformation. Combining it with a ductile steel for the cores 15a and 15b makes it possible to produce, in these cores, for example by pressing, projecting parts and recessed parts such as corrugations or ribs for example, which allow the resistance of said cores 15a and 15b to warping to be improved appreciably and thus allow their weight to be reduced for the same strength.

Assembling the various elements of the beam using seams have advantages. Specifically, it is compatible with steels with very good mechanical properties. These steels have a limiting bend radius of several times the thickness of the metal, and crimping involves bend radii of the order of the thickness of metal whereas the radius for assembling by seam can be tailored and chosen. This radius may, for example, be four to five times the thickness of the high-grade steel.

Compared with the welding method, assembling using a seam also has the advantage of very high productivity and is also easy to do, in a single press operation using a suitable tool.

Assembly by seam presents excellent strength in the plane perpendicular to the axis of the seam. For certain levels of loading and in order to avoid relative slippage along the axis of the seam, that is to say between the core and the sole plate, it is possible to insert some adhesive between the two elements at the seam or to weld by, locally fusing or preferably locally crushing the seam with a press tool comprising, for example, a V-shaped punch ending in a rounded portion and a flat anvil.

This operation can be performed on a press at a high rate. A suitable tool can simultaneously indent at least two seams and the spacing of the indentations is of the order of five to ten times the outer diameter of the seam.

In order to fit in with the geometry of the vehicle, the overall shape of the sole plates 11a and 11b has a slight curvature compatible with the low shapeability of steels with a high elastic limit. These parts may be produced, for example, by bending.

The shape of the cores 15a and 15b is more complex but is compatible with the ability to shape the chosen steel of which to make them.

Thus, this combination of materials therefore makes it possible to produce a complex shape that meets the esthetic requirements of motor vehicles.

The beam 10 may be coated with a synthetic material 32 (FIG. 1) which acts as a cushion in low-speed impacts and constitutes the outer skin of the bumper, thus giving the part the appearance of the bumpers in common use.

The role of the cushion of synthetic material associated with the steel structure is primordial for low-speed impacts, for example collisions with a wall or a post.

By deforming elastically, the synthetic material allows the contact pressure to be spread over the beam 10 and allows the force to be reduced in low-speed impacts.

This synthetic material absorbs the kinetic energy of the vehicle by elastic deformation. The synthetic material used can be formed of synthetic foams with appropriate mechanical properties, such as cellular rubbers, for example.

The beam according to the invention, intended to form a front or rear bumper for motor vehicles, makes it possible to improve the performance of this vehicle in the event of a frontal impact and to reduce the repair costs. It has a high level of energy absorption and makes it possible to reduce the weight and the number of parts by comparison with the conventional structures.

What is claimed is:

1. A bumper beam for motor vehicles, comprising:
   vertical front and rear metallic sole plates;
   at least one elongated metallic core positioned between the sole plates;
   hollow metallic energy absorbers formed at both ends of the core, the energy absorbers positioned at right angles to the sole plates or to said core, a ratio of elastic limit to breaking stress for the core and also for the energy absorbers is lower than the ratio for the sole plates.

2. The bumper beam as claimed in claim 1, wherein the metallic material of the sole plates is a steel with a very high elastic limit higher than 400 MPa.

3. The bumper beam as claimed in claim 1, wherein the metallic material of the sole plates is an aluminum with a very high elastic limit above 250 MPa.

4. The bumper beam as claimed in claim 1, wherein the sole plates are made of the same metallic material and have different thickness.

5. The bumper beam as claimed in claim 1, wherein the metallic material of the front sole plate has a ratio of elastic limit to breaking stress that is lower than that of the metallic material of the rear sole plate.

6. The bumper beam as claimed in claim 1, wherein two parallel cores extend between said sole plates.

7. The bumper beam as claimed in claim 1, wherein the thicknesses of the sole plates and of the cores are different.

8. The bumper beam as claimed in claim 1, wherein the thicknesses of the sole plates are greater than that of the cores.

9. The bumper beam as claimed in claim 1, wherein said core comprises a succession of alternating projecting and recessed parts extending at right angles to the longitudinal axis of the core.

10. The bumper beam as claimed in claim 9, wherein the period of the projecting parts and recessed parts is uniform along the entire length of a corresponding core.

11. The bumper beam as claimed in claim 9, wherein the projecting parts and recessed parts of one core are offset with respect to the projecting parts and recessed parts of the other core.

12. The bumper beam as claimed in claim 9, wherein the distance between the top of the project parts and the bottom of the recessed parts of said core is between $\frac{1}{20}^{th}$ and one-half of the period of the projecting parts or recessed parts.

13. The bumper beam as claimed in claim 9, wherein the distance between the bottom of the recessed parts of the two cores is between 0 and half the period of said projecting parts or recessed parts.

14. The bumper beam as claimed in claim 9, wherein the projecting parts are formed by depressions or cuts with folded-over edges.

15. The bumper beam as claimed in claim 1, wherein the hollow body of each energy absorber has a cross section in the shape of a four-armed cross, the arms extending continuously in twos and making an angle of 90° between them.

16. The bumper beam as claimed in claim 15, wherein the hollow body of each energy absorber is open on one of its sides.

17. The bumper beam as claimed in claim 15, wherein the hollow body of each energy absorber is closed along its entire periphery.

18. The bumper beam as claimed in claim 15, wherein the wall of the hollow body of each energy absorber is formed by a succession of facets.

19. The bumper beam as claimed in claim 18, wherein the facets are of identical width.

20. The bumper beam as claimed in claim 18, wherein there are twenty-four facets.

21. The bumper beam as claimed in claim 18, wherein the facets make an angle of 135° between them.

22. The bumper beam as claimed in claim 1, wherein the hollow body of each energy absorber has a first end connected to the front sole plate and a second end resting on a longeron of the structure of the motor vehicle and passing through the rear sole plate via an orifice which has an outline of a shape that complements the cross section of said hollow body.

23. The bumper beam as claimed in claim 1, wherein the hollow body of each energy absorber has a first end resting on the front sole plate and a second end resting on a longeron of the structure of the motor vehicle and passing freely through the rear sole plate via an orifice which has an outline of a shape that complements the cross section of said hollow body, the hollow body being connected to the rear sole plate.

24. The bumper beam as claimed in claim 1, wherein the hollow body of each energy absorber has a first end resting on the front sole plate and a second end connected to the rear sole plate, said sole plate resting on a longeron of the structure of the motor vehicle.

25. The bumper beam as claimed in claim 1, wherein the hollow body of each energy absorber rests on the front sole plate and is connected to the end edge of said core.

26. The bumper beam as claimed in claim 1, wherein the hollow body of each energy absorber rests on the front sole plate and is formed of two symmetric hollow half-bodies connected to said core and joined together at their free edges.

27. The bumper beam as claimed in claim 1, wherein the hollow body of each energy absorber rests on the front sole plate and is formed of two symmetric hollow half-bodies each extending from a core, the two hollow half-bodies being joined together at their free edges.

28. The bumper beam as claimed in claim 1, wherein the metallic material of the hollow body of each energy absorber has a thickness of less than 1.2 mm.

29. The bumper beam as claimed in claim 1, wherein the two sole plates and said core are joined together.

30. The bumper beam as claimed in claim 1, together with a bumper synthetic foam coating.

* * * * *

UNITED STATES PATENT AND TRADEMARK OFFICE
CERTIFICATE OF CORRECTION

PATENT NO.  : 6,371,540 B1
DATED       : April 16, 2002
INVENTOR(S) : Campanella et al.

It is certified that error appears in the above-identified patent and that said Letters Patent is hereby corrected as shown below:

Title page,
Item [73], Assignee "Recherche et Developpement du Groupe Cockerill Sambre en Abrégé" should read -- Recherche et Developpement du Groupe Cockerill Sambre en Abrégé RD-CS --

Signed and Sealed this

Fifteenth Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,371,540 B1  
DATED : April 16, 2002  
INVENTOR(S) : Campanella et al.

It is certified that error appears in the above-identified patent and that said Letters Patent is hereby corrected as shown below:

<u>Title page,</u>
Item [30], Foreign Application Priority Data, "May 7, 1999" should be -- July 5, 1999 --.

Signed and Sealed this

Fourteenth Day of February, 2006

JON W. DUDAS
*Director of the United States Patent and Trademark Office*